L. B. SPERRY.
AEROPLANE HEIGHT INDICATOR.
APPLICATION FILED JULY 13, 1917.
1,339,006.
Patented May 4, 1920.
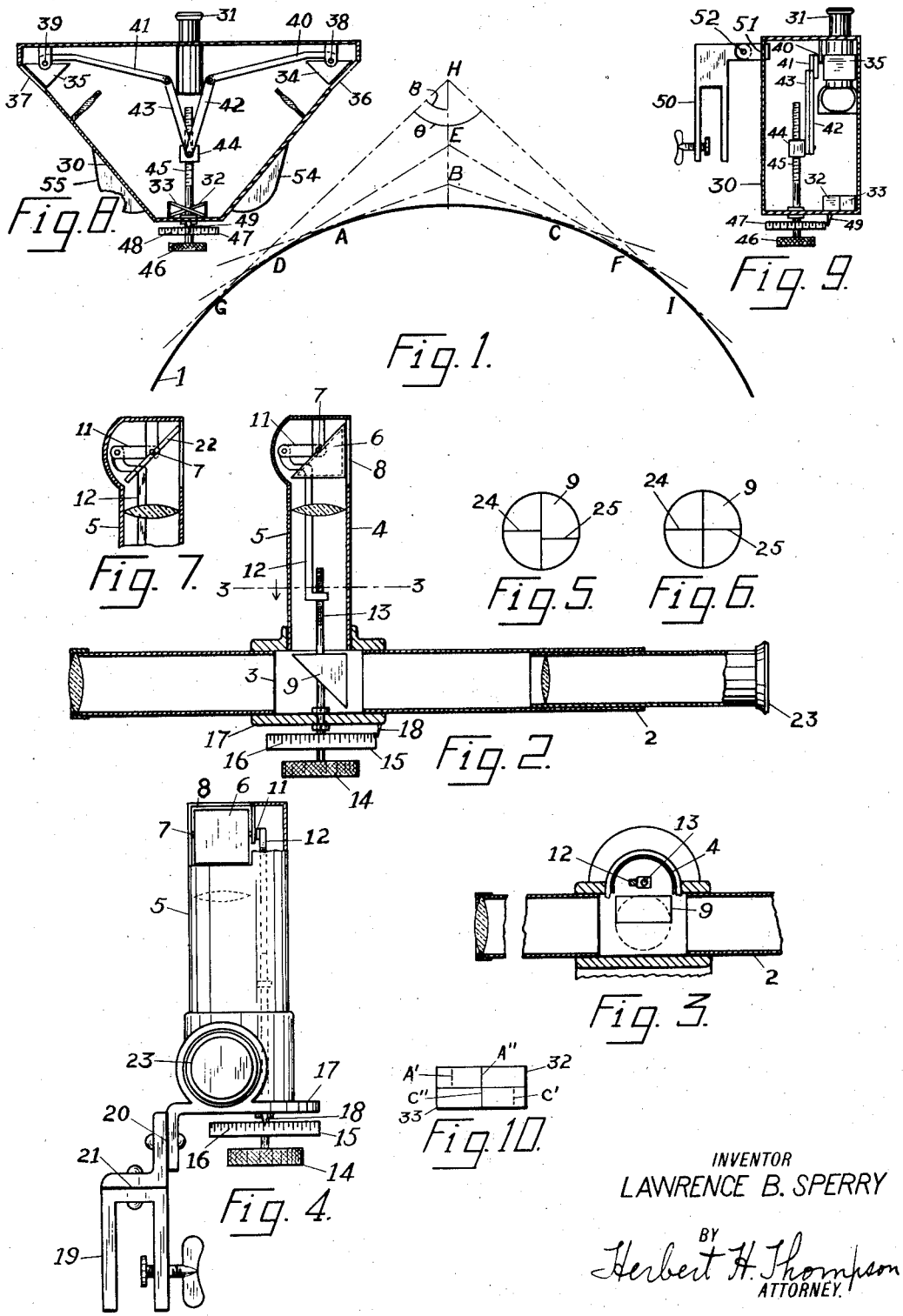
INVENTOR
LAWRENCE B. SPERRY
BY
Herbert H. Thompson
ATTORNEY.

UNITED STATES PATENT OFFICE.

LAWRENCE B. SPERRY, OF BROOKLYN, NEW YORK, ASSIGNOR TO THE LAWRENCE SPERRY AIRCRAFT COMPANY, INC., OF NEW YORK, N. Y., A CORPORATION OF NEW YORK.

AEROPLANE HEIGHT-INDICATOR.

1,339,006.   Specification of Letters Patent.   Patented May 4, 1920.

Application filed July 13, 1917. Serial No. 180,268.

*To all whom it may concern:*

Be it known that I, LAWRENCE B. SPERRY, a citizen of the United States of America, residing at 1505 Albermarle road, Brooklyn, in the county of Kings and State of New York, have invented certain new and useful Improvements in Aeroplane Height-Indicators, of which the following is a specification.

This invention relates to a method and apparatus for determining the height of aircraft, and makes use of the angle formed by the intersection of two lines projected from the aeroplane, in opposite directions, to the horizon. The object of the invention is to render it possible to determine with greater accuracy the height of aeroplanes.

Referring to the drawings wherein I have shown what I now consider to be the preferred forms of my invention:

Figure 1 is a diagram illustrating the principle involved in my invention.

Fig. 2 is a side elevation partly in section, of an instrument with which the observations are made.

Fig. 3 is a sectional elevation of a portion of the instrument taken on line 3—3 Fig. 2.

Fig. 4 is a front elevation of the instrument.

Figs. 5 and 6 illustrate the manner in which the opposite horizons appear at different stages of the observation.

Fig. 7 illustrates a modification of a portion of the instrument shown in Fig. 2.

Fig. 8 is a front elevation of a modified form of instrument.

Fig. 9 is a side elevation thereof, and Fig. 10 is a detail view.

In Fig. 1 I have shown at 1 an exaggerated representation of the earth's curvature. B, E and H represent different altitudes above the earth, while the lines B—A, B—C, E—D, E—F, H—G and H—I represent the lines of vision from these altitudes to the horizon on opposite sides. It will be seen from the diagram that as the altitude increases, the distance from the point of observation to the horizon also increases, while the angle, as for instance, G H I, formed by the intersection of the lines of vision to the opposite horizons decreases. It will be obvious then that the angles A B C, D E F and G H I bear some definite relation to the altitude of the point of observation.

Thus it can be demonstrated that $$a = \frac{r}{\sin\frac{\theta}{2}} - r$$

where $a$ is the altitude desired, $r$ the radius of the earth and $\theta$ the angle formed by the two lines of vision, intersecting at the point of observation.

Viewed from a generic aspect, my invention comprises means for determining the altitude of an aeroplane by determining the function of the angle $\theta$ referred to above and in the provision of apparatus for determining and indicating this function.

Accordingly, therefore, I have designed an instrument through which the opposite horizons may be viewed simultaneously, the lines of vision intersected and the angle between them resolved into terms of distance above the earth.

One form of this instrument is shown in Figs. 2, 3 and 4, and comprises an ordinary telescope 2 cut in two transversely at some point 3, and having a reflecting unit 4 inserted therein.

The reflecting unit may comprise a casing 5 in which may be placed a prism 6 pivotally mounted in the casing at 7, and having one of its faces adjacent an opening 8 in the casing, and a second prism 9 placed below prims 6 and extending half way across the interior of the telescope 2 as shown in Fig. 3. A lever 11 may be secured at one end to pivot 7 for turning the prism 6, and may be pivotally connected at the other end to an arm 12 through which a threaded rod 13 is screwed. A knob 14 may be provided on rod 13 for turning the same, while a drum 15 having a scale 16 marked on its periphery may be fastened to said rod. Adjacent scale 16 and secured to a fixed part 17 of the instrument is an index 18. In place of prism 6 I may use a mirror 22 shown in Fig. 7.

The instrument may be fastened to any suitable part of the aeroplane by means of a clamp 19, and is pivoted at 20 and 21, for universal movement.

The operation of the instrument is as follows: Suppose the aeroplane to be flying at a height B, Fig. 1. The operator looking through the eyepiece 23 of the telescope, tilts the telescope until he sees the horizon ahead at A. Bringing the horizon to the middle of the telescope the image appears at 24, Fig. 5. The operator then turns knob 14, which, through screw rod 13 moves arm 12 up or down until the rear horizon C is reflected by prism 6 or mirror 22 to prism 9 where it may be seen at 25, Fig. 5. The prism or mirror is further adjusted by means of knob 14, until both horizons are brought into alinement as shown in Fig. 6.

The scale 16 coacting with index 18 may be calibrated to indicate the angle A B C, or the calibrations may be and preferably are in terms of height above the earth, such as the number of feet.

In Figs. 8 and 9 I show a modified form of instrument for measuring the altitude. This form comprises a casing 30, having an eyepiece 31 looking down upon two reflectors 32 and 33 within the casing. These reflectors are placed side by side as shown in Fig. 10 and reversely sloped.

On opposite sides of the casing, adjacent the openings 36 and 37, I have shown two prisms 34 and 35. These prisms are shown pivoted at 38 and 39 respectively, and are provided with levers 40 and 41 for turning them on their pivots. Arms 42 and 43 are each pivotally secured at one end to a block 44, and at the opposite end to levers 40 and 41 respectively for actuating said levers. A rod 45 revolubly secured in the bottom of the casing 30 is screwed through block 44, and is provided on its outer end with a knob 46 whereby the rod may be turned to move the said block up and down. A drum 47 provided with graduations 48 on its periphery may be fastened on the rod 45, for reading in connection with an index 49 secured to the casing 30.

The reflectors 32 and 33 are shown tilted to such an angle that all images coming upon them from prisms 34 and 35 will be reflected through the eye piece 31.

A clamp 50 may be provided on the instrument for securing the same to the aeroplane. This clamp is shown pivoted at 51 and 52 to allow the instrument to swing freely.

Instead of the prisms 34 and 35, I may use mirrors adapted to be mounted and operated in a similar position to the illustrated prisms.

The operation of this form of instrument is as follows: Presuming the aeroplane to be flying through B as in the previous case, the observer in the aeroplane, looking through the eyepiece 31 at the reflectors 32 and 33, may bring the instrument to approximately a horizontal position. He then turns knob 46 to change the angle of the reflectors 34 and 35 so as to receive and reflect upon the mirrors 32 and 33 the images of the opposite horizons at A and C. The horizons appearing as at A' and C', Fig. 10, adjustments may be made through knob 46 until the images are brought into alinement as at A'' C''. As in the previous form, the reading of index 49 on scale 48 may indicate the height of the aeroplane.

In order that this instrument may still be useful when the horizon can be seen on only one side, or when one side is mountainous, and would cause an inaccurate reading, I may, by making the instrument pendulous, view the horizon on but one side, and by manipulating knob 46 bring the image of the horizon to a central position on the reflector 32 or 33 as the case may be. For this purpose, hair lines may be placed at A'' and C'' on said reflectors, and the image of the horizon may be brought into coincidence with the one or the other of said lines. It will be readily seen that the reading on scale 48 in connection with index 49 will be precisely the same as if both horizons were being viewed. The actual angle B measured would always be one half of the angle θ between the two tangents so that a function of the angle θ would still be indicated.

In order to cause the instrument to hang vertically, therefore, I have shown pivot 51 near the top of the instrument, thereby causing the instrument to act as a pendulum. I may also add weights 54 and 55 to increase the pendulous effect. Pivot 52 will of course be rigid enough to prevent turning at this point except with the aid of the observer.

While I have represented the pendulum in its simple form, it should be understood that any other form may be used, such for instance as a gyroscopically stabilized pendulum.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others, without interfering with the more general results outlined, and the invention extends to such use.

Having described my invention, what I claim and desire to secure by Letters Patent is:

1. An instrument for measuring the height of aeroplanes, comprising means for observing the horizon on one side; means for observing the horizon on the opposite side; means for alining the images of both of said horizons, and means connected with said alining means for indicating the height of the aeroplane.

2. Height measuring apparatus for air craft, comprising a telescope for viewing the horizon on one side; means for reflecting the horizon on the opposite side, through said telescope; means for alining both of said horizons, and means responsive to said alining means for indicating the height of said craft.

3. Height indicating apparatus for air craft, comprising a pair of reflectors; a second pair of reflectors; means for adjusting said first pair of reflectors whereby the opposite horizons may be reflected by said first reflectors upon said second reflectors, and indicating means connected with said adjusting means.

4. Height indicating apparatus for air craft, comprising two sets of reflectors; means for varying the angle of one of said sets with respect to the other set whereby the images may be brought into coincidence, and altitude indicating means connected with said varying means.

5. Means for ascertaining the altitude of air craft above the horizon, comprising a pendulous member; means connected with said member for viewing the horizon; means for adjusting the image of said horizon to a fixed relation with said member, and means connected with said adjusting means, for indicating said altitude.

6. In an instrument for determining altitude, the combination of a pair of relatively adjustable telescopical instruments capable of being simultaneously directed toward the two opposite horizons, means for directing the light rays from the opposite horizons and focusing said rays into one and the same telescopical instrument, and a scale calibrated in units of altitude coöperating with a telescope for indicating altitude according to adjustment.

7. An altitude indicating instrument, the combination with a telescope capable of being directed toward the horizon, another telescopical instrument coöperating with the first named telescope and capable of being directed toward the opposite horizon, means for directing the light rays from one telescope into the other telescope for obtaining a view of both horizons within one telescope, means for adjusting one telescope relatively to the other, and a scale coöperating with the adjusting means for directly showing the altitude of the instrument at each successive adjustment.

In testimony whereof I have affixed my signature.

LAWRENCE B. SPERRY.